Feb. 11, 1958 D. L. WAUGH 2,822,856
METHOD AND APPARATUS FOR MANUFACTURING COVERED BELTS
Filed Jan. 23, 1956

INVENTOR.
DALE L. WAUGH
BY
ATTORNEY

United States Patent Office 2,822,856
Patented Feb. 11, 1958

2,822,856
METHOD AND APPARATUS FOR MANUFACTURING COVERED BELTS

Dale L. Waugh, Dayton, Ohio, assignor to The Dayton Rubber Company, a corporation of Ohio Application January 23, 1956, Serial No. 560,503

11 Claims. (Cl. 154—3)

The present invention relates to belting and particularly to power transmission belting which includes an outer protective wrapper or cover on one or more of its surfaces. The present invention also relates to an improved method and apparatus for the manufacture of such belting.

In the art of belting, particularly power transmission belting, wherein the belts are exposed to oil, grease, sunlight and other deteriorating elements as well as to the severe structural demands of power transmission, it has been desired in many cases to provide a protective cover, usually of fabric impregnated or coated with a rubber or elastomeric material, about the core of the belt. As is well known to those skilled in the art, it is of extreme importance that power transmission belts, which constantly flex as they pass around such sheaves or pulleys only to straighten out upon coursing the distance therebetween, be made as flexible as possible in order that this constant flexing and straightening will not create excessive heat or otherwise result in excessive wear. As is also well known to those familiar with the power transmission belting art, the provision of the otherwise desired covers or protective layers necessarily involves a decrease in belt flexibility.

In order to reduce as much as possible the stiffening of the belt as a result of the presence of covers or wrappers thereon, it has become a common practice to form the covers of a fabric which has been cut in separate widths diagonally of a fabric web, the warp and weft threads of which are at right angles. When such a web, the complementary woven threads of which intersect at right angles, is cut into individual widths along lines at an angle, usually 45 degrees or thereabouts, to the threads, the individual widths are then applied to the belts longitudinally thereof so that, everything else being equal, the angle of intersection of the threads in the finished belt with the longitudinal axis of the belt would be approximately 45 degrees. As a result of this angular disposition of the threads, it has developed that the individual threads do not present the full effect of their substantial inextensibility to the normal flexing of the belt and when the belt does flex, the threads are merely displaced from their normal angular relationship so as to render the angle of their intersection with the longitudinal axis less than the 45 degrees at which they normally lie thereto. While the previously employed angle of cutting of the original fabric web and the resulting angle of the intersection of the threads in the belt with the longitudinal axis thereof has been in the neighborhood of 45 degrees, it has been found that an even larger angle of intersection, say 50 or 55 degrees, of the threads with the longitudinal axis of the belt will provide still greater flexibility in that the angularly disposed threads may be pulled still further out of their normal angular relationship before they exert their inextensible influence upon the extension of the belt which must attend its flexing. Such an increased angle of intersection of the threads with the longitudinal axis of the belt however, was found to be difficult to achieve in view of the fact that, during the handling of the cover widths cut from the original web, and particularly during the application thereof to the belt core, the threads tend to be prematurely displaced from their desired angular relationship and drawn so that the angle of their intersection with the belt's longitudinal axis becomes actually less than the 45 degrees or the angle at which they were originally cut.

It has therefore developed that although the original bias cutting of the web of fabric having its complementary threads intersecting at right angles has resulted in some improvement in the flexibility of belts, the maximum possible effect of such cutting has been lost due to the fact that in the handling of these fabric widths, the individual threads have been displaced from their desired right-angle relationship such that they open in an acute angle longitudinally of the belt and consequently, the angle of intersection of any of the threads with the longitudinal axis of the belt is less than 45 degrees. As this angle is reduced, the result has been that the ability of the cover material to stretch and the otherwise obtainable gain in flexibility from the use of the bias-cut fabric will be lost in the finished belt.

It is accordingly an object of the present invention to provide improved belting and particularly covered or wrapped power transmission belting.

It is a further object of the present invention to provide such power transmission belting which will have improved flexibility notwithstanding the presence thereon of a wrapper or cover.

It is yet another object of the present invention to provide a power transmission belt having over at least the pulley contacting surfaces thereof a protective wrapper or cover of woven fabric wherein the complementary threads intersect at an obtuse angle opening longitudinally of the belt.

It is a further object of the present invention to provide an improved method for the manufacture of such belting.

In order to achieve these and other objects and advantages of the present invention which will be apparent from a reading of the following disclosure it is proposed to employ the conventionally used bias-cut cover fabric widths, but to apply these widths to the belt in such a manner that, instead of reducing the angle of intersection of the threads as viewed when they are subsequently positioned on the belt longitudinally thereof, such angle will actually be increased and made greater than the original 90 degrees. It should be observed that the use of fabric having the complementary threads thereof intersecting at right angles one group of threads lying longitudinally of the original web, is desirable up to a point in that, during the handling and calendering of the web normally attending the application of a rubber or similar elastomeric material thereto, the fact that one set of threads extends longitudinally of the web makes the web substantially inextensible so that it will not be pulled and stretched during this original handling. It is obvious of course, that any stretching of the fabric prior to its actual application to the belt will reduce its ability to stretch once so applied and will result in a decrease in the flexibility of the final product.

Applicant has discovered that, if the bias-cut cover fabric widths are applied to the belt core at a time and at the point at which it is in a condition of the greatest flexure which it will achieve during its actual operation, the desired 90 degree angular relationship of the complementary threads will exist at this point of flexure but when the belt straightens out or returns from such flexed position, the angular relationship of the fabric threads will actually be increased. It will be understood that this flexing of the belt at the time the cover is applied thereto may be controlled in many ways to correspond with the actual flexing conditions of operation of the belt and, for example, if a reversely rotating idler pulley is to be employed against the backside of the belt such that the belt will have a reverse flexure at some point in its path, the belt during the covering thereof may also be reversely flexed and the fabric applied thereto.

In conventionally used V-belts or power transmission belts of trapezoidal or truncated triangular cross section, the belts are normally of a substantial thickness. Where such thickness is involved, it is obvious that the greatest extension of the belt or the cover thereon will be required at that surface thereof which is away from the direction of flexure. Applicant has found that the best results may be obtained if the bias-cut fabric cover is applied to the belt, not only at the point of its flexure, but also to that surface thereof which is away from the direction of flexure.

The invention having been thus briefly described may be more clearly understood from a reading of the following description of certain preferred embodiments thereof in connection with which reference may be had to the appended drawings.

Figure 2:
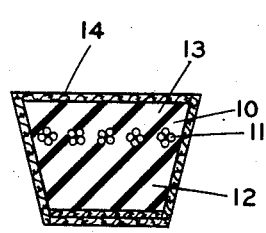
Figure 2 is a cross section on line 2—2 of Figure 1 showing generally the relationship of the wrapper of the present invention to the power transmission belt core.
Figure 1:
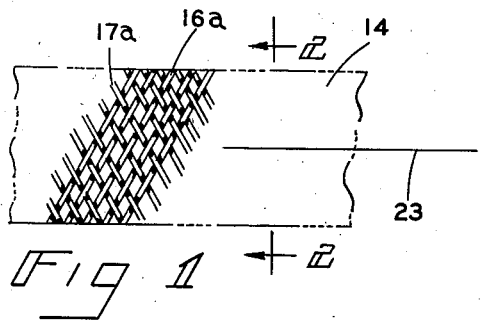
Figure 1 is a fragmentary plan view of a typical power transmission belt incorporating a fabric cover according to the present invention.

Referring now to Figures 1 and 2 a typical belt of the type considered by the present invention comprises a belt core 10 consisting of a strength portion 11 of a flexible but inextensible material such as textile cords, wire cables or the like embedded in a body of elastomeric material, that portion 12 below the strength portion being generally referred to as the compression section and the portion 13 above the strength portion being referred to as the tension section. These terms are derived from the fact that the strength portion 11 is normally placed at the theoretical axis transversely of the belt about which it flexes with the result that that portion of the belt inwardly thereof or below the cord line 11 is under compression while the portion exteriorly thereof is under tension. In certain of the power transmission belts, fabric components may be incorporated either in the compression or tension section of the belt to give added strength and rigidity. It is this core of the belt which provides the power transmission strength thereof and it is this core which is sought to be protected by the application of the cover designated generally by the number 14.

In conventional belts the cover 14 consists of a cross-woven fabric, usually bias-cut as explained above and applied so that the complementary threads thereof form an angle of approximately 90 degrees with each other or 45 degrees with the longitudinal axis of the belt, the fabric normally being impregnated and/or coated with a layer of rubber, synthetic rubber or similar elastomeric plastic material.

Figure 3:
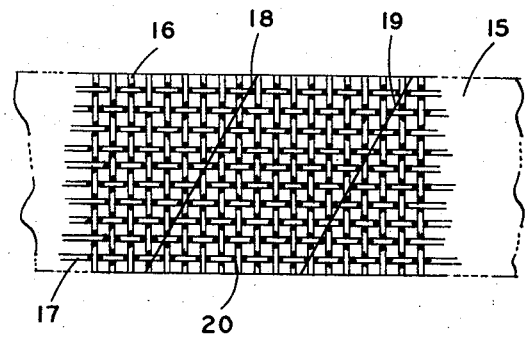
Figure 3 is a plan view of a typical fabric web from which bias-cut cover widths according to this invention may be cut.
Figure 4:
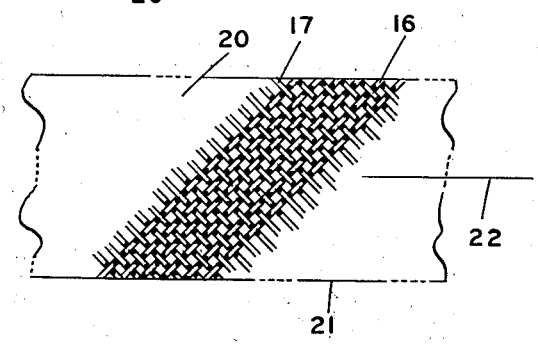
Figure 4 is a plan view of an individual bias-cut cover width formed from the web shown in Figure 3.

Referring to Figure 3, the cover material normally begins in the form of a web 15 of cross-woven fabric having transversely extending weft or fill threads 16 and longitudinally extending warp threads 17, the warp and weft threads intersecting at right angles. Such a web is substantially inextensible insofar as the inextensibility of the warp threads 17 present their full effect to the stretching longitudinally of the web while the inextensible fill threads 16 provide a similar inextensible influence upon stretching transversely of the web. In view of the fact that the web at this stage is therefore substantially inextensible in either direction, it may be conveniently handled and passed through calendering rolls and the like wherein the rubber or similar elastomeric material is applied thereto. Once the web 15 has passed through the calendering rolls or other severe handling it may then be cut for example along the diagonal or biased lines 18 and 19 to form the individual width 20 therefrom. Such a width 20 is shown in Figure 4 as it would be removed from the web of Figure 3. Viewing this web and comparing the same with the position thereof in the web 15 of Figure 3 it will be seen that the warp threads 17 still intersect the weft threads 16 at right angle; but, in view of the fact that the web has been cut on lines at an angle, say 45 degrees, to the edges or longitudinal axis of the web, the threads 16 and 17 no longer extend longitudinally of and transversely of the strip 20. Rather do these threads intersect the edges 21 or the longitudinal axis 22 of the strip at an angle corresponding to the angle with the edges of the web 15 of the lines 18 or 19 along which they were cut. It can be seen that if this strip so cut were applied longitudinally of a belt, the threads 16 and 17 would make an angle with the longitudinal axis of the belt equal to their angle with the longitudinal axis 22 of the strip as shown in Figure 4, which as explained above is also equal to the angle which the lines 18 and 19, upon which such strip was cut, made with the longitudinal axis of the original web. If such angular relationship of the threads is established in the final belt it will also be understood that the strip will be extensible to a limited extent as a result of the fact that the angular relationship of the threads may be displaced upon the application of a stretching force to the strip before the inextensibility of the threads will operate to limit the stretching. It will also be apparent however, that as the angular relationship of the thread is affected so that the angle opening longitudinally of the strip is reduced more and more, the inextensible nature of all of the threads will be more nearly aligned with the direction of the stretching force such that the threads will begin to retard the stretchability and as a result will limit the free flexibility of a belt about which such a strip is applied. It will also be apparent on the other hand from examination of Figure 4 that if the angle of the cross threads with the longitudinal axis of the belt were increased from say the 45 degrees now shown to 50 or 55 degrees, or if the angle of intersection of the threads were altered so that they no longer intersected at right angles but rather intersected at such an angle that the angles opening longitudinally of the belts were obtuse or greater than 90 degrees, greater extensibility would be obtained in view of the fact that the belt could be stretched further before the individual threads would be displaced to the extent that their threads would be aligned sufficiently with the direction of the application of the stretching force to prevent further stretching. This desired angular relationship of the individual threads of the fabric to the longitudinal axis of the belt is shown in Figure 2 wherein the longitudinal axis 23 of the belt is intersected by the threads 16a and 17a at an angle which is greater than 45 degrees or, stated otherwise, wherein the threads themselves intersect each other at an angle which is considerably greater than the original 90 degrees.

In order to achieve this desired angular relationship of the threads of the woven fabric in the finished belt, applicant has discovered a method and apparatus for specially handling this fabric width such as 20 of Figures 3 and 4. This apparatus consists generally of a means for applying the cover material similar to the strip 20 in Figures 3 and 4 to a belt core 25 similar to 10 of Figure 1. The means for supplying the covering material 24, may consist simply of a train of rollers, pulleys or sheaves 26, 27 and 28 which merely convey the material from a feed roll 28a to the point of its application.

Figure 5:
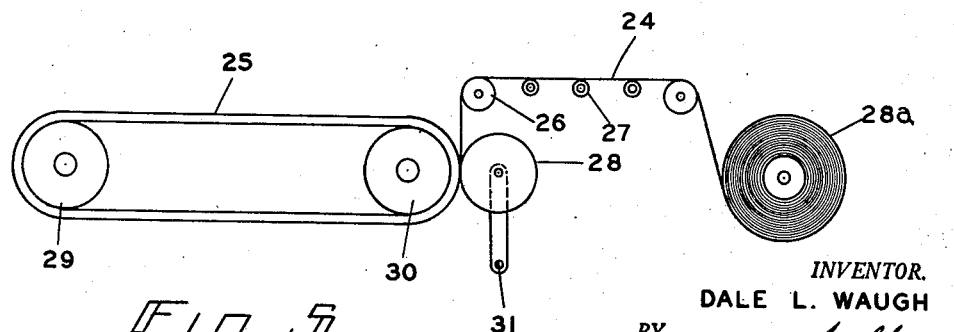
Figure 5 is a schematic illustration in elevation showing one preferred manner for applying the cover width such as shown in Figure 4 to a belt core.

It can be seen from Figure 5 that the belt core 25 is placed in a position approximating that in which it will be operated, this position being simulated by the provision of sheaves or pulleys 29 and 30 similar to such as the finished belt will actually operate upon. In the case of a trapezoidal V-type belt as shown in Figure 2 for example the sheaves 29 and 30 would simply be V-groove pulleys. One of the sheaves or pulleys 29 and 30 is provided with a driving mechanism (not shown) such that the belt core 25 will be set in rotation. The mechanism for driving either of the pulleys 29 or 30 will also be linked, preferably positively, with a driving mechanism for the feeder rolls or pulleys such as 26, 27, 28 and 28a so that the peripheral speed of the belt core 25 and the rate of travel of the cover material 24 will be substantially equal and no stretching of the material will result as it is pulled from the conveying assembly. On the other hand the greatest advantage resulting from the present invention may be obtained if in fact the peripheral speed of the belt core 25 is less than the rate of feed of the cover 24 such that in effect it might be said the cover is "stoved" on to the core. Since, however, the cover material 24 is of an extremely flexible fabric it will be appreciated that actually forcing the same on to the belt core will not result in any appreciable stoving effect. Applicant has discovered however that notwithstanding the flexible nature of the cover strip and the inability to handle the same while it is in its free, completely flexible state the desired advantages long sought in the power transmission belting art may be achieved by applying the cover material 24 to the belt core 25 at that point of its flexure approximating the greatest flexure which it will undergo during operation. Thus the pulley or wheel 28 for example may be pivoted upon a shaft such as 31 which may be spring loaded or otherwise adjustably forced against the belt core 25 while it is in travel. If the fabric web 24 is fed on to the core 25 at the point the roller 28 is forced against the core it will be appreciated that the cover material may be pressed firmly against the core notwithstanding the fact that both are in motion. Either at this point or sometime prior to the actual bringing of the cover material and belt core to the covering operation, the respective surfaces of these components to come in contact may be made tacky. In the case of conventionally employed rubber or synthetic rubber coated or impregnated fabric, and the conventional vulcanizable elastomeric belt cores, the elastomeric material may be compounded in its original stages to possess sufficient building tack to enable the cover to be firmly secured to the core without the use of any additional adhesives or cements. Once such provision, no matter how made results in the firm sticking of the cover to the core, the cover will no longer be in its freely flexible state and the individual threads thereof may be much less readily displaced. As a result, the angle of the intersection of the complementary threads of the cover fabric is relatively, permanently established at the point it is applied to the core. It has been found however, that, once the core passes on around the pulley for example 29 and straightens out or once the belt is removed from the pulleys altogether and assumes its normally circular configuration not affected by the presence of the pulleys, the threads will be forced in a manner which will cause the angle of their intersection longitudinally of the belt to spread or open so as to be greater than that at which they were first applied to the belt. Where, as explained above the belt being covered according to the method and apparatus of the present invention is a V-belt or other power transmission belt of considerable thickness, it follows that the greatest extensibility thereof will be required on that surface thereof which is away from the direction of flexure. Accordingly, in order to obtain the greatest advantages according to the present invention it is preferred that this cover strip 24 be applied not only at the point of greatest flexure of the belt but also on that surface thereof which is away from the direction of anticipated flexure.

The method of the present invention may be conveniently practiced as shown in Figure 5 by applying the belt core 25 about the spaced pulleys 29 and 30, the relationship between pulleys and the circumference of the belt core being such that, when the core is positioned upon the pulleys, it will be bent or curved so as to conform to a substantial portion of the periphery of the respective pulleys and will be supported thereby. Where the pulleys are of equal diameter as shown in Figure 5, the core will contact each pulley throughout substantially 180° of its circumference. The outermost peripheral surface of the core so positioned will be the surface of the belt opposite the direction of flexure thereof so that the cover fabric strip may be conveniently applied to such surface at some point on the core opposite a point at which its inner surface contacts and is supported by the pulley or sheave such as 30. Since, as the core begins to bend about the sheave, it will increase in flexure up to that point which is substantially at the center or midpoint of the arc of the contact between the core and the sheave, it is at this point of greatest curvature that the fabric cover strip should be stitched to the outer peripheral surface of the belt core to achieve the optimum results according to the present invention. Since at all other points in the belt as it operates about the pulleys the curvature will never exceed and will almost always be less than that at which it received the cover strip, the normal reduction in belt curvature will act to shrink the outer periphery of the belt core to which the cover fabric has been stitched as described above with the result that the warp and weft threads of such fabric will be forced to a greater degree of obliquity.

While for the sake of clarity the showing of Figure 5 involves only the application of the covering material to the top or outermost surface of the core, it will be understood that a wide strip of the cover fabric so applied may be wrapped around the other sides of the core if desired by the use of additional rollers and guides according to well-known methods and procedures.

In the case of typical belts composed of rubber, synthetic rubber or other vulcanizable elastomeric compositions, the wrapped or covered core is placed under heat or pressure, usually in a press or a mold and vulcanized whereupon an integrated product is obtained and the desired conditions of the cover derived according to the above are maintained.

While the foregoing description has involved such particularization as is necessary in connection with specific embodiments of the present invention, such particularization should not be construed as limiting the scope of the invention as it is defined in the appended claims.

I claim:

1. A method for the manufacture of belting comprising forming a belt core of reinforced elastomeric material, flexing a portion of said core, and applying a cover layer of bias-cut fabric material to said core at the point of its flexure to the surface thereof which is opposite the direction of flexure.

2. A method for the covering of a belt core comprising calendering a web of fabric the threads of which are woven at right angles one group of which lies longitudinally of the web and the other group of which extends transversely thereof, cutting diagonally of said web to form individual widths of bias-cut rubberized fabric, and applying these widths longitudinally of the belt core while it is in a flexed condition said application being made at that portion of the belt which is flexed and on that surface thereof which is away from the direction of flexure whereby, when the belt is released from its flexed condition the woven threads will be displaced from their right angular relationship and will intersect at obtuse angles opening longitudinally of the belt.

3. A method for covering V-belts comprising forming a reinforced elastomeric belt core of trapezoidal cross-section, bending said core to at least partially surround a sheave, and applying a cover strip of bias-cut fabric to the surface of said core opposite that in contact with said sheave at a point substantially at the mid-point of the arc of such contact.

4. A method for covering a reinforced elastomeric belt core comprising impregnating a web of cross-woven fabric with a tacky elastomeric composition, forming an individual width of such fabric wherein the woven threads thereof intersect the edges thereof at oblique angles, bending said core about a sheave and longitudinally applying said width to said core on the surface thereof made convex by such bending and substantially at the point of greatest curvature thereon.

5. A method for covering a reinforced vulcanizable elastomeric belt core comprising impregnating a web of cross-woven fabric with a tacky vulcanizable elastomeric composition, forming an individual width of such fabric wherein the woven threads thereof intersect the edges and the longitudinal axis thereof at oblique angles, bending said core about a sheave, applying said width longitudinally to said core on the surface thereof made convex by such bending and substantially at the point of greatest curvature thereon, pressing the width against the core and vulcanizing the parts thus assembled.

6. A method according to claim 5 wherein said width is stitched to said core by pressing the former against the latter while said latter is supported by said sheave.

7. An apparatus for the covering of elastomeric belt cores comprising a support for holding such core in a flexed condition and the means for pressing a strip of the cover material against that portion of said core which is so held.

8. An apparatus for the covering of elastomeric belt cores comprising a rotatable cylindrical support for such a core, means for holding said core tightly against at least a portion of the cylindrical surface of said support and means for pressing a strip of covering material against said core at a point on the surface thereof substantially opposite the mid-point of the arc of its contact with said cylindrical support.

9. An apparatus for the covering of elastomeric belt cores comprising spaced rotatable sheaves for supporting such a core in flexed condition, means for rotating at least one of such sheaves and thereby the core supported thereon, means for supplying a strip of covering material to the surface of said core outwardly of the sheaves upon which the same is supported, and means for pressing such strip against said core on the surface away from said sheaves and at a point thereon which is substantially at the mid-point of the arc of contact between said core and one of said sheaves.

10. A method for the manufacture of belting comprising forming a belt core of reinforced elastomeric material, flexing a portion of said core and stoving a cover layer of bias cut fabric material on said core at the point of its flexure to the surface thereof which is opposite the direction of flexure.

11. An apparatus for the covering of an elastomeric belt core comprising a support for holding such core in a flexed condition, means for setting said belt core so held in motion at a predetermined speed, means for pressing a strip of the cover material against that portion of said core which is flexed while it is in such motion and means for feeding said cover material to the point at which it is pressed against said core at a predetermined speed which is greater than the speed of the motion of said core.

References Cited in the file of this patent

UNITED STATES PATENTS

| | | |
|---|---|---|
| 2,064,781 | Collins | Dec. 15, 1936 |
| 2,240,735 | Yelm et al. | May 6, 1941 |
| 2,519,590 | Mitchell | Aug. 22, 1950 |
| 2,579,822 | Homeier | Dec. 25, 1951 |